United States Patent
Knight et al.

(10) Patent No.: US 9,832,841 B2
(45) Date of Patent: Nov. 28, 2017

(54) WALL-PLATE-SWITCH SYSTEM AND METHOD

(71) Applicants: Darren Charles Knight, Pleasant Grove, UT (US); Richard Camden Robinson, Lindon, UT (US)

(72) Inventors: Darren Charles Knight, Pleasant Grove, UT (US); Richard Camden Robinson, Lindon, UT (US)

(73) Assignee: Snap Rays LLC, Vineyard, UT (US)

( * ) Notice: Subject to any disclaimer, the term of this patent is extended or adjusted under 35 U.S.C. 154(b) by 0 days.

(21) Appl. No.: 15/428,099

(22) Filed: Feb. 8, 2017

(65) Prior Publication Data

US 2017/0208663 A1    Jul. 20, 2017

Related U.S. Application Data

(63) Continuation-in-part of application No. 15/409,508, filed on Jan. 18, 2017.

(60) Provisional application No. 62/279,831, filed on Jan. 18, 2016.

(51) Int. Cl.
| | |
|---|---|
| H02G 3/14 | (2006.01) |
| H05B 37/02 | (2006.01) |
| H01H 9/02 | (2006.01) |
| H01H 13/04 | (2006.01) |
| H01H 21/04 | (2006.01) |

(Continued)

(52) U.S. Cl.
CPC ....... *H05B 37/0218* (2013.01); *H01H 9/0271* (2013.01); *H01H 13/04* (2013.01); *H01H 21/04* (2013.01); *H02B 1/46* (2013.01); *H05B 33/0842* (2013.01)

(58) Field of Classification Search
CPC ............ H05B 37/0218; H05B 33/0842; H01H 9/0271; H01H 13/04; H01H 21/04; H01H 9/0264; H02B 1/46; H02G 3/10; H02G 3/12; H02G 3/16; H02G 3/20; H02G 3/086; H02G 3/14; H02G 3/081; H01R 13/44
USPC ...................................................... 174/66, 67
See application file for complete search history.

(56) References Cited

U.S. PATENT DOCUMENTS

| | | |
|---|---|---|
| 2,015,698 A | 10/1935 | Tiffany |
| 2,227,549 A | 1/1941 | McNeill |
| 2,385,620 A | 9/1945 | Fleckenstein |

(Continued)

FOREIGN PATENT DOCUMENTS

| | | |
|---|---|---|
| DE | 202006006354 | 10/2007 |
| EP | 2211210 | 3/2007 |

(Continued)

OTHER PUBLICATIONS

Plate Pals Wallplate Thermometers, http://www.platepals.com/ last visited Apr. 21, 2017, 2006.

*Primary Examiner* — Pete Lee

(57) ABSTRACT

In one example, a wall plate may have or include an electrical circuit. The electrical circuit may include a switch and a light sensor supported on a base in the form of a circuit board. A switch cover may cover the light sensor and selectively move with respect to the base through a first range of motion. The switch cover may actuate the switch, when moving through the first range of motion. Additionally, the switch cover may be transparent or semitransparent to enable light to pass through and reach the light sensor regardless of where the switch cover is within the first range of motion.

15 Claims, 8 Drawing Sheets

(51) Int. Cl.
  *H02B 1/46*    (2006.01)
  *H05B 33/08*   (2006.01)

(56) References Cited

U.S. PATENT DOCUMENTS

| | | |
|---|---|---|
| 2,428,167 A | 9/1947 | Linton |
| 2,515,820 A | 7/1950 | Clark |
| 2,575,820 A | 11/1951 | Linton |
| 2,580,056 A | 12/1951 | Wheeler, Jr. |
| 2,749,381 A | 6/1956 | Farish |
| 2,880,285 A | 3/1959 | Robison et al. |
| 2,908,743 A | 10/1959 | Premoshis |
| 2,934,590 A | 4/1960 | Thompson et al. |
| 3,120,414 A | 2/1964 | Farish, Jr. |
| 3,307,030 A | 2/1967 | Francisco |
| D212,760 S | 11/1968 | Bordner |
| 3,522,595 A | 8/1970 | White |
| 3,588,489 A | 6/1971 | Gaines |
| 3,680,237 A | 8/1972 | Finnerty, Sr. |
| 3,739,226 A | 6/1973 | Seiter et al. |
| D230,274 S | 2/1974 | Polus |
| 3,859,454 A | 1/1975 | Mann |
| 3,879,101 A | 4/1975 | McKissic |
| 4,000,405 A * | 12/1976 | Horwinski .............. F21S 8/035 362/95 |
| 4,038,582 A | 7/1977 | Horwinski |
| 4,117,258 A | 9/1978 | Shanker |
| 4,255,780 A | 3/1981 | Sakellaris |
| 4,282,591 A | 8/1981 | Andreuccetti |
| 4,514,789 A | 4/1985 | Jester |
| 4,534,486 A | 8/1985 | Eidson |
| 4,611,264 A | 9/1986 | Bradley |
| 4,616,285 A | 10/1986 | Sackett |
| 4,617,613 A | 10/1986 | Rice |
| 4,755,913 A | 7/1988 | Sleveland |
| 4,774,641 A | 9/1988 | Rice |
| D330,267 S | 10/1992 | Hendrix |
| 5,248,919 A | 9/1993 | Hanna |
| 5,290,175 A | 3/1994 | Robinson |
| 5,384,428 A | 1/1995 | Luu |
| 5,406,439 A | 4/1995 | Crane et al. |
| 5,434,378 A * | 7/1995 | McLean ................... H01H 3/20 200/43.11 |
| 5,473,517 A | 12/1995 | Blackman |
| D366,339 S | 1/1996 | Waller |
| 5,481,442 A | 1/1996 | Dickie et al. |
| 5,485,356 A | 1/1996 | Nguyen |
| 5,622,424 A | 4/1997 | Brady |
| 5,670,776 A | 9/1997 | Rothbaum |
| 5,683,166 A | 11/1997 | Lutzker |
| D395,314 S | 6/1998 | Oikawa |
| D399,825 S | 10/1998 | Heung et al. |
| 5,816,682 A | 10/1998 | Marischen |
| D401,566 S | 11/1998 | Gesmondi |
| D407,072 S | 3/1999 | Gaule |
| 5,914,826 A | 6/1999 | Smallwood |
| 6,000,807 A | 12/1999 | Moreland |
| 6,010,228 A | 1/2000 | Blackman |
| 6,023,021 A | 2/2000 | Matthews et al. |
| 6,087,588 A | 7/2000 | Soules |
| 6,089,893 A | 7/2000 | Yu et al. |
| D429,829 S | 8/2000 | Doran |
| 6,234,651 B1 * | 5/2001 | Kodama ................... H01H 9/18 362/276 |
| D464,865 S | 10/2002 | Luu |
| D473,528 S | 4/2003 | Wengrower |
| 6,547,411 B1 | 4/2003 | Dornbusch |
| 6,765,149 B1 | 7/2004 | Ku |
| D500,743 S | 1/2005 | Savicki, Jr. et al. |
| 6,974,910 B2 | 12/2005 | Rohmer |
| 7,011,422 B2 | 3/2006 | Robertson et al. |
| 7,036,948 B1 | 5/2006 | Wyatt |
| D542,627 S | 5/2007 | Rohmer et al. |
| 7,247,793 B2 | 7/2007 | Hinkson |
| 7,270,436 B2 | 9/2007 | Jasper |
| 7,318,653 B2 | 1/2008 | Chien |
| D567,633 S | 4/2008 | Anderson |
| 7,360,912 B1 | 4/2008 | Savicki, Jr. |
| D576,566 S | 9/2008 | Wu et al. |
| D577,985 S | 10/2008 | Kidman |
| 7,506,990 B2 | 3/2009 | Glazner |
| 7,547,131 B2 | 6/2009 | Faunce et al. |
| 7,576,285 B1 | 8/2009 | Savicki, Jr. |
| D606,029 S | 12/2009 | Chou |
| 7,745,750 B2 | 6/2010 | Hewson et al. |
| 7,821,160 B1 | 10/2010 | Roosli et al. |
| 7,946,871 B1 | 5/2011 | Yu et al. |
| 8,003,886 B1 | 8/2011 | Rintz |
| D650,112 S | 12/2011 | Bryant |
| 8,148,637 B2 | 4/2012 | Davidson |
| 8,304,652 B2 | 11/2012 | McBain |
| 8,393,747 B2 | 3/2013 | Kevelos et al. |
| 8,511,866 B1 | 8/2013 | Mendez |
| 8,564,279 B2 | 10/2013 | Johnson et al. |
| 8,668,347 B2 | 3/2014 | Ebeling |
| 8,697,991 B2 | 4/2014 | Davidson |
| D719,699 S | 12/2014 | Bryant |
| 9,482,426 B2 | 11/2016 | Diotte |
| 2001/0046130 A1 | 11/2001 | Cunningham et al. |
| 2003/0013503 A1 | 1/2003 | Menard et al. |
| 2003/0124022 A1 | 7/2003 | Georges et al. |
| 2004/0247300 A1 | 12/2004 | He et al. |
| 2005/0264383 A1 | 12/2005 | Zhang |
| 2006/0065510 A1 | 3/2006 | Kiko et al. |
| 2006/0072302 A1 | 4/2006 | Chien |
| 2006/0161270 A1 | 7/2006 | Luskin et al. |
| 2006/0262462 A1 | 11/2006 | Barton |
| 2008/0073117 A1 | 3/2008 | Misener |
| 2008/0266121 A1 | 10/2008 | Ellul |
| 2009/0153438 A1 | 6/2009 | Miller et al. |
| 2009/0225480 A1 | 9/2009 | Baxter |
| 2009/0284385 A1 | 11/2009 | Tang et al. |
| 2011/0056720 A1 | 3/2011 | Davidson |
| 2011/0210833 A1 | 9/2011 | McNeely et al. |
| 2012/0008307 A1 | 1/2012 | Delany |
| 2012/0156937 A1 | 6/2012 | Almouli |
| 2012/0182172 A1 | 7/2012 | Sorensen |
| 2012/0215470 A1 | 8/2012 | Maguire |
| 2012/0316808 A1 | 12/2012 | Frader-Thompson et al. |
| 2013/0063848 A1 | 3/2013 | Thorpe et al. |
| 2013/0221868 A1 | 8/2013 | Diotte et al. |
| 2015/0371534 A1 | 12/2015 | Dimberg et al. |

FOREIGN PATENT DOCUMENTS

| | | |
|---|---|---|
| KR | 1019930025223 | 6/1995 |
| KR | 1020080047328 | 11/2009 |
| KR | 1020090098056 | 4/2010 |
| WO | 2007122141 | 11/2007 |
| WO | 2012006812 | 1/2012 |

* cited by examiner

WALL-PLATE-SWITCH SYSTEM AND METHOD

RELATED APPLICATIONS

This patent application is a continuation-in-part of U.S. patent application Ser. No. 15/409,508 filed Jan. 18, 2017, which claims the benefit of U.S. Patent Application Ser. No. 62/279,831 filed Jan. 18, 2016, both of which are hereby incorporated by reference.

BACKGROUND

Electrical fixtures such as switches and power outlets are ubiquitous in modern buildings. Accordingly, what is needed are systems and methods that leverage such electrical fixtures to provide additional functionality for the benefit of human users thereof.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Reference will now be made to the figures wherein like structures will be provided with like reference designations. In the following description, for purposes of explanation, numerous specific details are set forth in order to provide a thorough understanding of the present systems and methods. It will be apparent, however, that systems and methods may be practiced without these specific details. It is understood that the figures are diagrammatic and schematic representations of some embodiments of the invention, and are not limiting of the present invention, nor are they necessarily drawn to scale. Reference in the specification to "an example" or similar language means that a particular feature, structure, or characteristic described in connection with the example is included in at least that one example, but not necessarily in other examples. Additionally, features shown and/or described in connection with one figure may be combined with features shown and/or described in connection with other figures.

Figure 1:
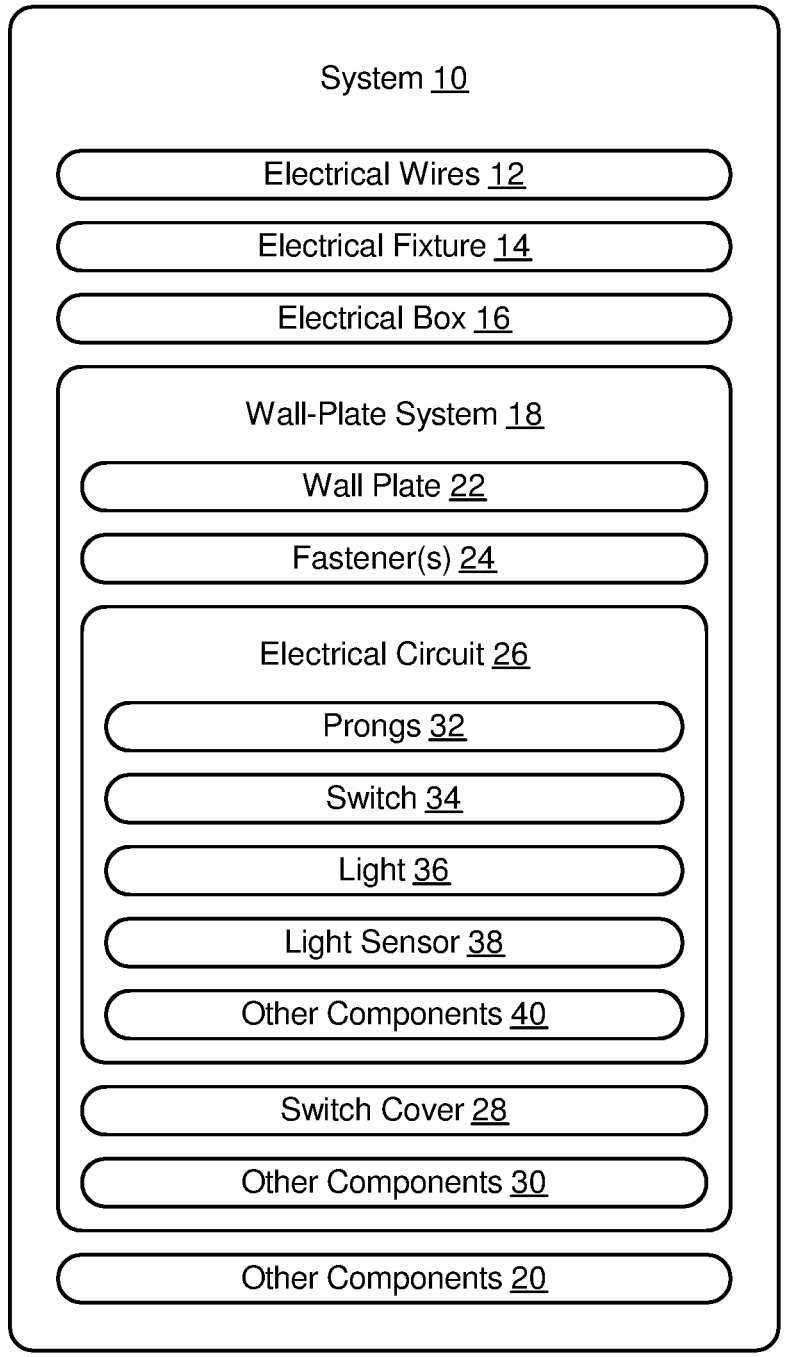
FIG. 1 is a schematic block diagram of one embodiment of a system in accordance with the present invention.

Referring to FIG. 1, systems (10) and methods in accordance with the present invention may leverage the electrical infrastructure of modern buildings to provide additional functionality to the human users or inhabitants thereof. In selected embodiments, such a system (10) may include electrical wires (12), one or more electrical fixtures (14), one or more electrical boxes (16), one or more wall-plate systems (18), one or more other components (20), or the like or a combination or sub-combination thereof.

For example, modern buildings may include electrical wires (12) that deliver electrical power to one or more electrical fixtures (14) such as lights, outlets, switches, and other devices. The electrical wiring (12) may typically terminate in an electrical box (16) mounted in a wall, ceiling, or floor. Connections between the electrical wiring (12) and the electrical fixture (14) may be made within the electrical box (16). For example, within an electrical box (16), electrical wiring (12) may be connected to an electrical fixture (14) by stab-in connectors or with screw terminals on the sides of the electrical fixture (14).

After the connections between the electrical wires (12) and the electrical fixture (14) have been made, a wall-plate system (18) in accordance with the present invention may be placed over the electrical fixture (14) to cover the opening to the electrical box (16), allow access to the electrical fixture (14), and provide an aesthetically pleasing interface or transition between the electrical fixture (14) and the surrounding wall, ceiling, floor, or the like.

A wall-plate system (18) may comprise a wall plate (22), one or more fasteners (24), one or more electrical circuits (26), a switch cover (28), one or more other components (30), or the like or a combination or sub-combination thereof. A wall plate (22) may form the backbone of a wall-plate system (18) and may be primarily responsible for covering the opening to the electrical box (16), allowing access to the electrical fixture (14), and providing an aesthetically pleasing interface or transition between the electrical fixture (14) and the surrounding wall, ceiling, floor, or the like.

One or more fasteners (24) may secure a wall plate (22) in place. For example, one or more fasteners (24) may secure a wall plate (22) to an electrical fixture (14). The electrical fixture (14) may be mounted within an electrical box (16), which may be mounted to a wall, ceiling, floor, or the like. Accordingly, the one or more fasteners (24) may provide one link in securing a wall plate (22) with respect to a wall, ceiling, floor, or the like.

One or more electrical circuits (26) may provide functionality above and beyond the functionality provided by an electrical fixture (14). For example, in selected embodiments, one or more electrical circuits (26) may provide a nightlight, guidelight, or the like. In such embodiments, one or more electrical circuits (26) may comprise one or more prongs (32), a switch (34), a light (36), a light sensor (38), one or more other components (40), or the like or a combination or sub-combination thereof. In selected embodiments, a switch cover (28), switch (34), light sensor (38), and base supporting the switch (34) may combine to form a switch assembly in accordance with the present invention.

In selected embodiments, to minimize the aesthetic impact of an electrical circuit (26) on a wall-plate system (18), a switch cover (28) may cover a light sensor (38) and extend to engage a switch (34). Thus, certain more functional aspects of an electrical circuit (26) may be hidden behind a switch cover (28).

Figure 2:
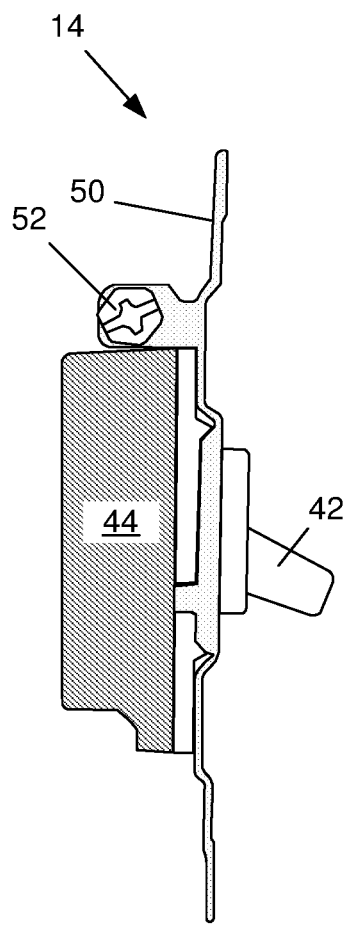
FIG. 2 is a side view of one embodiment of an electrical fixture.
Figure 3:
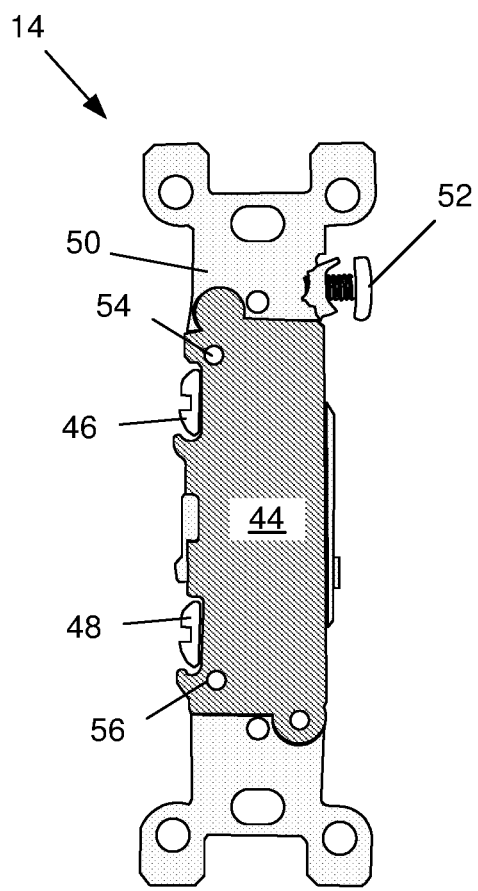
FIG. 3 is a rear view of the electrical fixture of FIG. 2.

Referring to FIGS. 2 and 3, in selected embodiments, an electrical fixture (14) in accordance with the present invention may be a switch, outlet, or the like. Accordingly, while the electrical fixture (14) illustrated in FIGS. 2 and 3 is a switch, in other embodiments an electrical fixture (14) may be an outlet or the like. Thus, the disclosure below with respect to an electrical fixture (14) embodied as a switch is provided by way of example and not by way of limitation.

Switches are a standard fixture in modern homes. Switches are typically placed near entryways or doors so that a person entering or leaving an area can easily turn on or off the lights or appliances. The position of the switch installations makes them ideal for incorporating nightlights, guidelights, illuminated images, or to provide other functions. For example, if a switch installation incorporated a nightlight, the nightlight would illuminate the entry way, the floor around the entryway and the light switch itself. The nightlight would provide a valuable reference point to allow a home owner to orient themselves and properly navigate the area.

Standard switches in North America (Canada, United States, Mexico, etc.) have two standard styles: toggle and decor. FIGS. 2 and 3 show a toggle switch, but similar components and features may be found on decor switches. Accordingly, in selected embodiments, an electrical fixture (14) may include a toggle (42) and a body (44). To change the state of the switch and its controlled load, the user may flip the toggle (42) up or down (or, depending on the installation, left or right). This may change the internal state of contacts within the switch to either connect or disconnect the electrical load from a power source.

The body (44) of an electrical fixture (14) may include two or more screw terminals (46, 48) and a yoke (50). The screw terminals (46, 48) may serve as attachment points for electrical wiring (12). For example, a "hot" wire may be attached to one of the terminals (46, 48) and a traveler wire may be attached to another terminal (46, 48). The hot wire may supply electrical power to the electrical fixture (14) and the traveler wire may connect the electrical fixture (14), in this case a switch, to an electrical load. Accordingly, when the switch is in the ON position, internal contacts may connect the first screw terminal (46) to the second screw terminal (48) and electrical energy is available to the load. When the switch is in the OFF position, the internal contacts do not make a connection between the screw terminals and there is no electrical power available to the load.

A yoke (50) may provide a structure to connect an electrical fixture (14) to an electrical box (16). In some electrical fixtures (14), a yoke (50) may be formed of metal and may include or be connected to a ground screw terminal (52). A ground wire may be connected to the ground screw terminal (52) to ensure that if there is a fault in the electrical system and electricity is applied to the yoke (50), this electricity will be dissipated through the ground wire.

One method of connecting one or more electrical wires (12) to the screw terminals (46, 48, 52) may include loosening the corresponding screws and wrapping the respective electrical wire (12) around the shaft of the screw, then tightening the screw to sandwich the wire (12) between the head of the screw and the body (44). Alternatively, or in addition thereto, one or more electrical wires (12) may be connected to an electrical fixture (14) using one or more stab-in connectors (54, 56). In such embodiments, the ends of the electrical wires (12) may be stripped and forced into the stab-in connectors (54, 56) to make an electrical connection with the internal contacts without utilizing screw terminals (46, 48). Even when stab-in connectors (54, 56) are used, the screw terminals (46, 48) may remain part of the electrical circuit of the electrical fixture (14).

Figure 4:
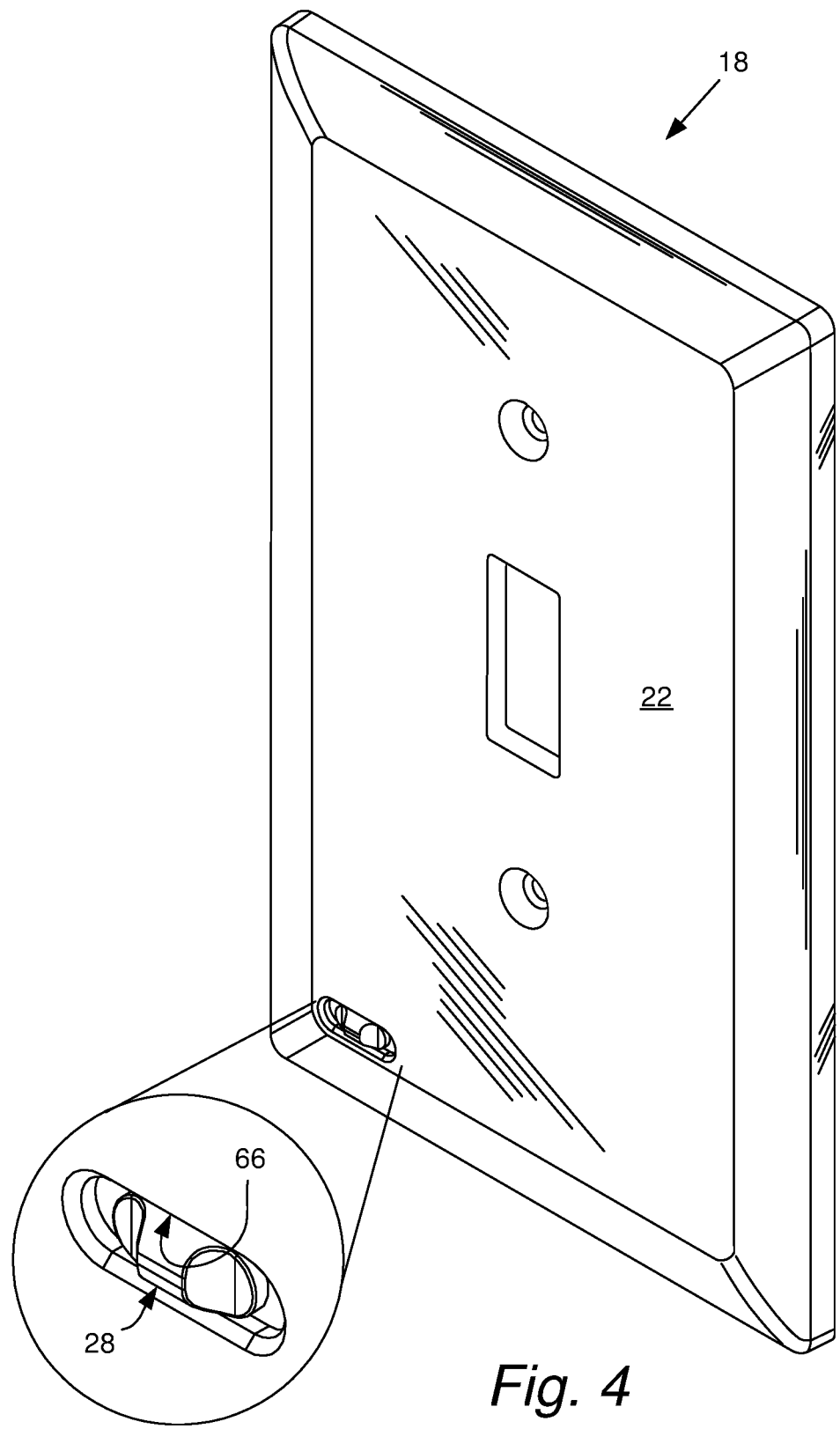
FIG. 4 is a front perspective view of one embodiment of a wall-plate system in accordance with the present invention that may be applied to the electrical fixture of FIG. 1.
Figure 5:
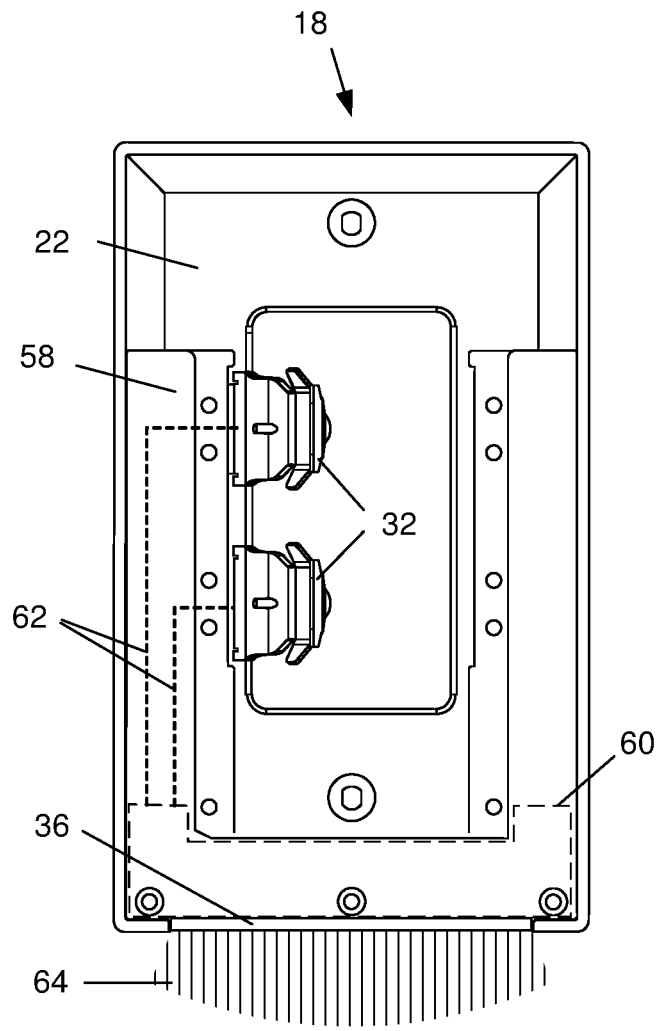
FIG. 5 is a rear view of the wall-plate system of FIG. 4.
Figure 6:
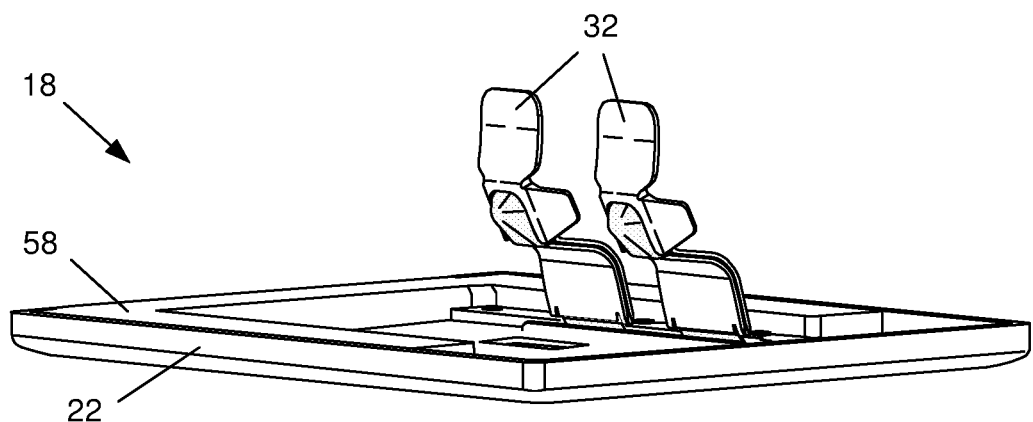
FIG. 6 is a side perspective view of the wall-plate system of FIG. 4.
Figure 7:
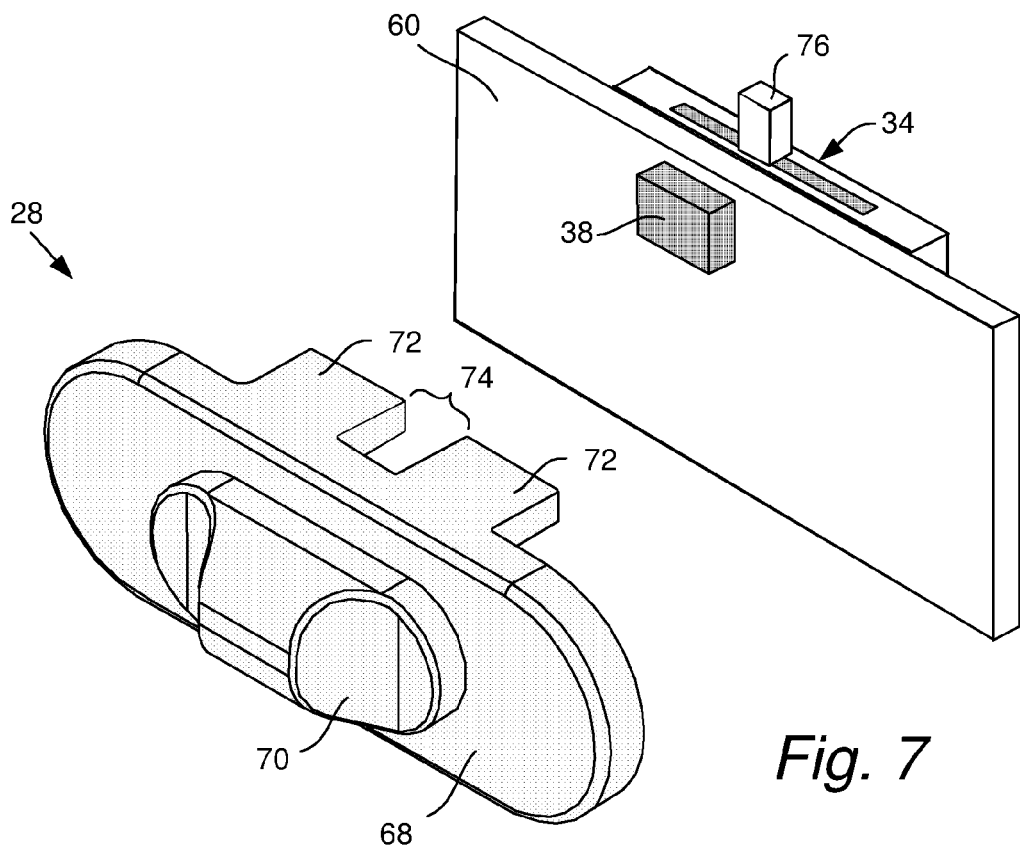
FIG. 7 is an exploded, front perspective view of one embodiment of a switch assembly comprising a base, light sensor, switch, and switch cover in accordance with the present invention.
Figure 8:
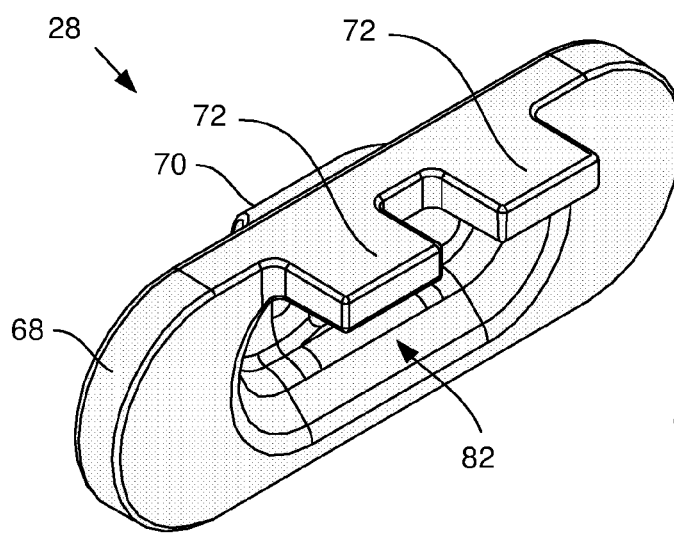
FIG. 8 is a rear perspective view of the switch cover of FIG. 7.
Figure 9:
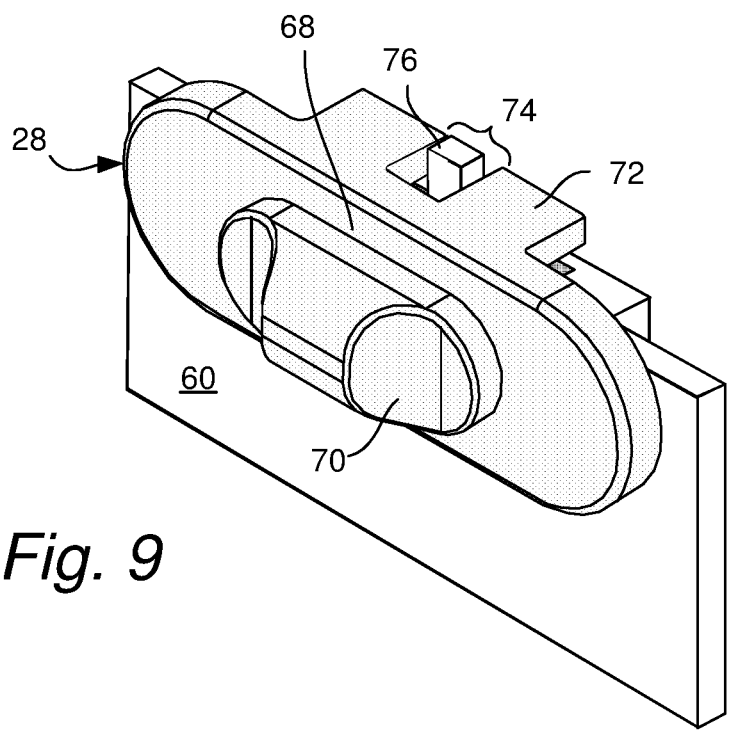
FIG. 9 is a front perspective view of the switch assembly of FIG. 7 with the actuator of the switch and the switch cover in a first position with respect to the base and light sensor.
Figure 10:
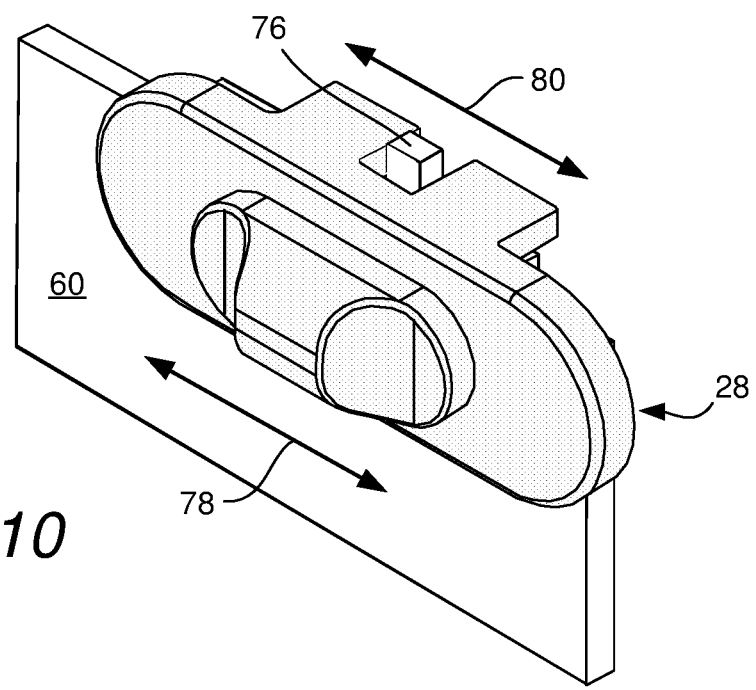
FIG. 10 is a front perspective view of the switch assembly of FIG. 7 with the actuator of the switch and the switch cover in a second position with respect to the base and light sensor.

Referring to FIGS. 4-6, in selected embodiments, a wall-plate system (18) in accordance with the present invention may be configured to engage an electrical fixture (14) in the form of a switch, outlet, or the like. Accordingly, while the wall-plate system (18) illustrated in FIGS. 4-6 is configured to engage an electrical fixture (14) in the form of a toggle switch, in other embodiments a wall-plate system (18) may be configured to engage a decor switch, outlet, or the like. Thus, the disclosure below with respect to a wall-plate system (18) configured to engage a switch is provided by way of example and not by way of limitation.

In certain embodiments, a wall-plate system (18) may include a wall plate (22), a back plate (58), and two or more prongs (32) extending rearward from the wall plate (22). The prongs (32) may be configured to contact the screw terminals (46, 48) of an electrical fixture (14). A circuit board (60) represented by the dashed shape may be sandwiched between the wall plate (22) and the back plate (58). A circuit board (60) may be connected to the prongs (32) by conductors (62) represented by the dotted lines. A circuit board (60) may also structurally and/or electrically support one or more components of an electrical circuit (26) such as a switch (34), light (36), light sensor (38), one or more other components (40), one or more electrical pathways there between, or the like or a combination or sub-combination thereof. When electrical power is available at the prongs (32) (i.e., when there is a voltage difference between the prongs (32)), an electrical circuit (26) may produce illumination (64) and/or some other desired functionality. In selected embodiments, the illumination (64) may extend downward from a bottom edge of the wall-plate system (18).

There are a wide variety of other ways that a wall-plate system (18) may be configured. For example, the illumination (64) may project out of different locations and/or be presented in different patterns. The illumination (64) may be a continuous bar or may be segmented into two, three, or more segments. The illumination (64) may be produced by individual LEDs, LED filaments, or other light sources.

Alternatively, or in addition thereto, the location and size of the circuit board (60) may be different from that shown. For example, in other embodiments, a circuit board (60) may be a different size such as a simple rectangle and/or may be divided into multiple sections or may be located in other locations with respect to a wall plate (22). Further, the prongs (32) may have different shapes, quantities and locations. For example, there may be two, three, four, five, or more prongs (32) at various locations and with various shapes.

In selected embodiments, a wall-plate system (18) in accordance with the present invention may enable one or more users thereof to control in one or more ways the light (64) output or other functionality provided by the wall-plate system (18). For example, in certain embodiments, a wall-plate system (18) may include a switch (34) providing manual control of the nightlight function of a wall-plate system (18). This switch (34) may be very small and may have, for example, the capability of controlling/stopping current flow through the electrical circuit (26) that accepts and operates on electrical line voltages (i.e., 120V AC in the United States) through wires (12). The switch (34) may fit in between a wall plate (22) and a back plate (58) without causing any change to the profile of the wall plate (22).

A switch (34) may have any of a number of configurations, including, but not limited to, an ON/OFF operation, a multi-illumination-level operation, a dimming operation, a light color changing operation, wireless networking, or other function. In certain embodiments, an aperture (66) in a wall plate (22) may provide access to a switch (34). For example, in selected embodiments, a switch cover (28) may be positioned within an aperture (66) in a wall plate (22) and extend slightly above the surface of the wall plate (22). Manipulation of a switch cover (28) may enable, support, or provide actuation of the switch (34).

Referring to FIGS. 7-10, in selected embodiments, a wall-plate system (18) may reflect or embody a desire to maximize the aesthetic appeal of a corresponding wall plate (22). This desire may be reflected in an effort to minimize the number of apertures within a wall plate (22) that are needed to accommodate an electrical circuit (26) and the functionality provided thereby. Accordingly, in certain embodiments, multiple aspects of an electrical circuit (26) may be serviced by one aperture (66) in a wall plate (22). For example, one aperture (66) in a wall plate (22) may enable or support both a switch (34) and a light sensor (38) of an electrical circuit (26).

As noted hereinabove, a switch (34) may control various aspects or functionality of an electrical circuit (26). A light sensor (38) may similarly control various aspects or functionality of an electrical circuit (26). For example, a light sensor (38) may enable an electrical circuit (26) to detect when ambient illumination renders unnecessary the illumination (64) provided by a wall-plate system (18). Accordingly, the output of a light sensor (38) may be used to control the operation of a light (36).

In order to sense ambient light, a light sensor (38) may require visual access to an ambient environment. In selected embodiments, a light sensor (38) may obtain such access through an aperture (66) corresponding to a switch cover (28). For example, a switch cover (28) may also function as a light sensor cover. Accordingly, in selected embodiments, a switch cover (28) may enable light to pass through and reach a light sensor (38). Thus, a switch cover (28) may be formed (e.g., molded) of a material (e.g., polymer) that is transparent or semitransparent.

In selected embodiments, a switch cover (28) may include a body portion (68), a handle portion (70), and one or more protrusions (72). A handle portion (70) may extend forward from the body portion (68). One or more protrusions (72) may extend (e.g., rearward) to engage a switch (34). For example, in certain embodiments, there may be two protrusions (72) with a gap (74) between them. The gap (74) may be sized and positioned to engage (e.g., bracket) an actuator (76) of a switch (34). Thus, a switch cover (28) may operate in conjunction with a circuit board (60) and certain components (34, 38) thereof.

For example, in certain embodiments, a light sensor (38) may be placed on a surface of a base material so as to be facing a switch cover (28). The base material may be a circuit board (60) or portion thereof. Accordingly, the appropriate electrical connections for the light sensor (38) may be made by the circuit board (60). On the opposite side of the base material (e.g., on the opposite side of a circuit board (60) or portion thereof) may be a switch (34) (e.g., a small low voltage switch). The switch (34) may include an actuator (76). Actuation of the actuator (76) may change a state of the switch (34). In certain embodiments, the switch (34) may be a multi-position slider switch, toggle switch, or the like.

Accordingly, in certain embodiments, a switch cover (28) may be placed over a light sensor (38) and an actuator (76) of a switch (34) may fit within a gap (74) between two protrusions (72). When a switch cover (28) is moved by a user (e.g., translated to the left or right) one or more protrusions (72) may move an actuator (76) of the switch (34) to a new position.

For example, a switch cover (28) may be selectively moved with respect to the base material through a first range of motion. This first range of motion may be aligned with a first axis (78). A switch (34), when actuated, may selectively move through a second range of motion. This second range of motion may be aligned with a second axis (80). In selected embodiments, the first axis (78) may be parallel to or co-axial with the second axis (80). Additionally, a base material (e.g., a circuit board (60)) may be planar in shape. Accordingly, in certain embodiments, the first axis (78) and/or second axis (80) may be parallel to the base material. Alternatively, the first axis (78) and/or second axis (80) may be perpendicular to the base material. In other embodiments, the first axis (78) may be parallel to the base material and the second axis (80) may be perpendicular or at another angle to the first axis and base material. For example, the switch cover (28) may include a ramp that depresses a plunger on a switch when the switch cover (28) is laterally translated parallel to the base material.

In selected embodiments, a switch cover (28) may include a cavity (82) on a back or rear side thereof. A cavity (82) may receive a light sensor (38) and allow for lateral translation of the switch cover (28) over the light sensor (38) while the light sensor (38) remains within the cavity (82). Thus, a switch cover (28) may serve dual purposes. It may be a cover that protects a light sensor (38). It may also be a handle that can be manually manipulated by a user to change the state of a switch (34) and consequently the behavior of an electrical circuit (26).

Figure 11:
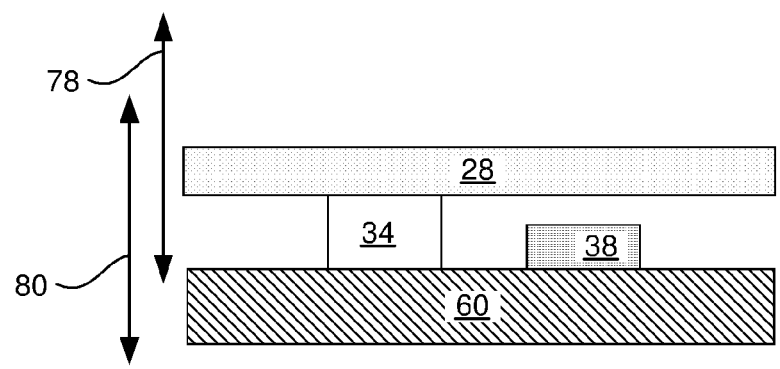
FIG. 11 is a schematic diagram of a top, cut away view of an alternative embodiment of a switch assembly in accordance with the present invention.

Referring to FIG. 11, in selected embodiments, a switch cover (28) may overlay or cover a switch (34) and a light sensor (38). The switch (34) may be a push button, contact, or pressure switch. Accordingly, the first axis (78) and/or second axis (80) may be perpendicular to the base material. Both the switch (34) and the light sensor (38) may be supported by a base (e.g., a circuit board (60)). Manually putting pressure on the switch cover (28) may compress or otherwise actuate the switch (34) and change its state.

Figure 12:
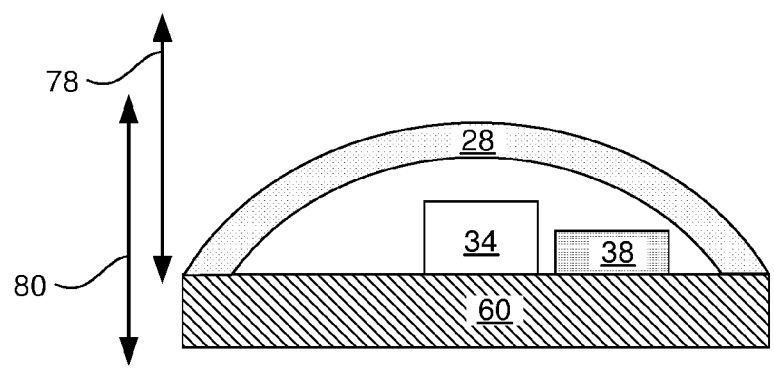
FIG. 12 is a schematic diagram of a top, cut away view of another alternative embodiment of a switch assembly in accordance with the present invention.

Referring to FIG. 12, in selected embodiments, a switch cover (28) may be embodied as a flexible element that overlays or covers a switch (34) and a light sensor (38). The switch (34) may be a push button, contact, or pressure switch. Accordingly, the first axis (78) and/or second axis (80) may be perpendicular to the base material. Both the switch (34) and the light sensor (38) may be supported by a base (e.g., a circuit board (60)). Manually deflecting the switch cover (28) may compress or otherwise actuate the switch (34) and change its state.

Figure 13:
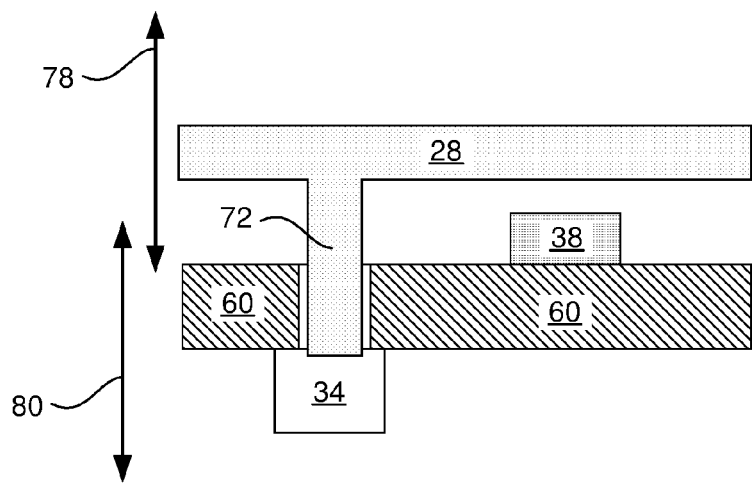
FIG. 13 is a schematic diagram of a top, cut away view of another alternative embodiment of a switch assembly in accordance with the present invention.

Referring to FIG. 13, in selected embodiments, a switch (34) and light sensor (38) may be mounted on opposite sides of a base (e.g., circuit board (60)). Manually putting pressure on the switch cover (28) may cause a protrusion (72) that extends through the base to compress or otherwise actuate the switch (34) and change its state. In this example, the first axis (78) and/or second axis (80) may be perpendicular to the base material.

Figure 14:
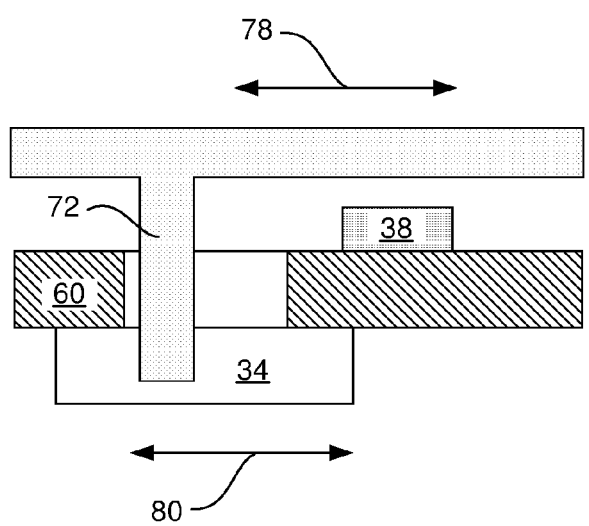
FIG. 14 is a schematic diagram of a top, cut away view of another alternative embodiment of a switch assembly in accordance with the present invention.

Referring to FIG. 14, in selected embodiments, a switch (34) and light sensor (38) may be mounted on opposite sides of a base (e.g., circuit board (60)). Translating the switch cover (28) may cause a protrusion (72) passing through the base to manipulate the state of the switch (24). In this example, the first axis (78) and/or second axis (80) may be parallel to the base material.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A system comprising: an electrical circuit comprising a switch and a light sensor; a base supporting the switch and the light sensor; a switch cover covering the light sensor and selectively moving with respect to the base through a first range of motion; the switch cover actuating, within the first range of motion, wherein the first range of motion is aligned with a first axis and wherein the first axis is parallel to the base and the switch cover being transparent or semitransparent; wherein the switch includes an actuator that is fit within a gap between two protrusions formed on the switch cover.

2. The system of claim 1, wherein the switch, when actuated, selectively moves through a second range of motion; and the second range of motion is aligned with a second axis.

3. The system of claim 2, wherein the first axis is parallel to or co-axial with the second axis.

4. The system of claim 3, wherein the base is planar in shape.

5. The system of claim 1 wherein the switch is a toggle or sliding switch.

6. The system of claim 1, further comprising: a wall; an electrical fixture mounted to the wall; and a wall plate interfacing between the wall and the electrical fixture.

7. The system of claim 6, wherein the electrical circuit, base, and switch cover form part of the wall plate.

8. The system of claim 7, wherein: the electrical circuit comprises a light forming part of the wall plate; and the switch controls a flow of electricity to the light.

9. A system comprising: a wall; an electrical fixture mounted to the wall; a wall plate forming an interface between the electrical fixture and the wall; the wall plate comprising: an electrical circuit comprising a switch and a light sensor; a base connecting the switch to the light sensor; a switch cover covering the light sensor and selectively moving with respect to the base through a first range of motion wherein the first range of motion is aligned with a first axis and wherein the first axis is parallel to the base; the switch cover actuating, within the first range of motion, the switch; and the switch cover being transparent or semitransparent; wherein the switch includes an actuator that is fit within a gap between two protrusions formed on the switch cover.

10. The system of claim 9, wherein the switch, when actuated, selectively moves through a second range of motion; and the second range of motion is aligned with a second axis.

11. The system of claim 10, wherein the first axis is parallel to or co-axial with the second axis.

12. The system of claim 11, wherein: the electrical circuit comprises a light, forming part of the wall plate; and the switch controls a flow of electricity to the light.

13. The system of claim 12, wherein the base is planar in shape.

14. The system of claim 13, wherein: the switch is a toggle or sliding switch.

15. A method comprising: tapping, by a wall plate, electrical power from two or more terminals of an installed electrical fixture, the wall plate comprising: an electrical circuit comprising a switch, a light sensor, and a light, a base connecting the switch to the light sensor, and a switch cover covering the light sensor; controlling, by at least one of the switch and the light sensor, delivery of the electrical power to the light; actuating, during the controlling, the switch by moving the switch cover with respect to the base through a range of motion; and sensing, by the light sensor during the controlling, light passing through the switch cover wherein the range of motion is aligned with a first axis and wherein the first axis is parallel to the base and wherein the switch includes an actuator that is fit within a gap between two protrusions formed on the switch cover.

* * * * *